US007738505B2

(12) United States Patent
Chang

(10) Patent No.: US 7,738,505 B2
(45) Date of Patent: Jun. 15, 2010

(54) SYNCHRONIZATION METHOD AND SYSTEM FOR TRANSMITTING VOICE DATA IN A MOBILE COMMUNICATION SYSTEM

(75) Inventor: Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1248 days.

(21) Appl. No.: 10/531,636

(22) PCT Filed: Jul. 12, 2004

(86) PCT No.: PCT/KR2004/001722

§ 371 (c)(1),
(2), (4) Date: Nov. 14, 2005

(87) PCT Pub. No.: WO2005/006598

PCT Pub. Date: Jan. 20, 2005

(65) Prior Publication Data

US 2006/0154679 A1 Jul. 13, 2006

(30) Foreign Application Priority Data

Jul. 11, 2003 (KR) ............ 10-2003-0047426

(51) Int. Cl.
H04J 3/06 (2006.01)
(52) U.S. Cl. .................... 370/507; 370/509
(58) Field of Classification Search ............ None
See application file for complete search history.

(56) References Cited

U.S. PATENT DOCUMENTS

| 5,796,735 | A  | * | 8/1998  | Miller et al.  | 370/395.4 |
| 6,539,004 | B1 | * | 3/2003  | Sawyer         | 370/331   |
| 6,570,871 | B1 |   | 5/2003  | Schneider      |           |
| 6,879,599 | B1 | * | 4/2005  | Galyas et al.  | 370/466   |
| 7,116,646 | B1 | * | 10/2006 | Gustafson et al. | 370/313 |
| 2001/0043577 | A1 |   | 11/2001 | Barany et al. |           |
| 2002/0177460 | A1 | * | 11/2002 | Beasley et al. | 455/502  |
| 2003/0009337 | A1 |   | 1/2003  | Rupsis         |           |
| 2003/0027595 | A1 |   | 2/2003  | Ejzak          |           |
| 2003/0064725 | A1 |   | 4/2003  | Niska          |           |
| 2003/0076793 | A1 | * | 4/2003  | Gao            | 370/329   |
| 2006/0233137 | A1 | * | 10/2006 | Dantu et al.   | 370/331   |

FOREIGN PATENT DOCUMENTS

| WO | WO 98/20627 | 5/1998  |
| WO | WO 98/51033 | 11/1998 |
| WO | WO 01/15473 | 3/2001  |

OTHER PUBLICATIONS

3$^{rd}$ Generation Partnership Project 2, "3GPP2", LMSD Step 1, Nov. 2002.

* cited by examiner

Primary Examiner—Ricky Ngo
Assistant Examiner—Clemence Han
(74) Attorney, Agent, or Firm—The Farrell Law Firm, LLP

(57) ABSTRACT

A method and system for synchronizing transmission/reception timings delayed during transmission/reception of data frames for voice signals in a mobile communication system including a media gateway with a transcoder and a base station controller for exchanging digital voice signals with the media gateway. The media gateway or the base station controller performs synchronization control by detecting synchronization of forward data frames for the voice signals. As the base station controller requests synchronization, the media gateway adjusts transmission timing and acquires synchronization according to the adjusted transmission timing, thereby correctly transmitting/receiving data frames for the voice signals.

24 Claims, 15 Drawing Sheets

| IOS A1p | IOS A1p | EVRC/SMV | EVRC/SMV | IOS Amp | IOS Amp |
|---------|---------|----------|----------|---------|---------|
| SUA | SCCP | FP | FP | | |
| SCTP | M3UA | RTP* | GRE* | | |
| | SCTP | UDP | | SCTP | TCP/UDP |
| IP | IP | IP | IP | IP | IP |
| L2 | L2 | L2 | L2 | L2 | L2 |
| L1 | L1 | L1 | L1 | L1 | L1 |
| Case1 | Case2 | Case1 | Case2 | Case1 | Case2 |
| A1p interface | | A2p interface | | Amp interface | |

FIG.3

| Information Element | Element Direction | Type |
|---|---|---|
| Message Type | BSC -> MGW | M |
| Frame Protocol Control Procedure | BSC -> MGW | O |
| Time Synchronization Information | BSC -> MGW | O |
| Reverse Layer 3 Data | BSC -> MGW | O |
| Message CRC | BSC -> MGW | M |
| Cause | BSC -> MGW | O |

FIG.4A

| 7 | 6 | 5 | 4 | 3 | 2 | 1 | 0 | Octet |
|---|---|---|---|---|---|---|---|---|
| Codec_Indicator | | Rate_Reduction_Required | Data-Inclusion | | | | | 1 |
| Required Reduced Frame Number | | | BB Indicator | Rate Reduction Time Interval | | FSN | | 2 |
| Scaling | | | | Packet Arrival Time Error | | | | 3 |
| Frame Content | | | | | | | | 4 |
| Reverse Link Information + Layer 3 fill | | | | | | | | Variable |
| Length | | | | | | | | n |
| Signaling Message / Secondary Traffic | | | | | | | | Variable |

FIG. 4B

| Information Element | Element Direction | Type |
|---|---|---|
| Message Type | MGW -> BSC | M |
| Frame Protocol Control Procedure | MGW -> BSC | O |
| Time Synchronization Information | MGW -> BSC | O |
| Reverse Layer 3 Data | MGW -> BSC | O |
| Message CRC | MGW -> BSC | M |
| Cause | MGW -> BSC | O |

FIG.5A

| Octet | 7 | 6 | 5 | 4 | 3 | 2 | 1 | 0 |
|---|---|---|---|---|---|---|---|---|
| 1 | | Codec_Indicator | | Rate_Reduction AcK | FSN | | | |
| 3 | Scaling | | | Packet Arrival Time Error | | | | |
| 5 | Frame Content | | | | | | | |
| Variable | Forward Link Information + Layer 3 fill | | | | | | | |

FIG. 5B

| Octet | |
|---|---|
| 1 | |
| 0 | Frame_Protocol_Control_Procedure |
| 1 | |
| 2 | |
| 3 | Ack |
| 4 | Nack |
| 5 | FP_Mode |
| 6 | Frame Protocol Control Number |
| 7 | |

FIG. 6A

| Octet | 7 | 6 | 5 | 4 | 3 | 2 | 1 | 0 |
|---|---|---|---|---|---|---|---|---|
| 1 | Start of FSN | | | | | End of FSN | | |
| 2 | Number of Lost Frames | | | | | Reserved | | |
| 3 | Scaling | | Packet Arrival Time Error | | | | | |

FIG. 6B

| Octet | 7 | 6 | 5 | 4 | 3 | 2 | 1 | 0 |
|---|---|---|---|---|---|---|---|---|
| 1 | A2p Element Identifier | | | | | | | |
| 2 | Length | | | | | | | |
| 3 | 0/1 | Cause Value | | | | | | |

FIG. 6D

| Information Element | Element Direction | Type | |
|---|---|---|---|
| Message Type(Amp) | BSC< -> MGW | M | |
| Call Connection Reference | BSC< -> MGW | O | R |
| Mobile Identity(IMSI) | BSC< -> MGW | O | R |
| Mobile Identity(ESN) | BSC< -> MGW | O | C |
| A2p Bearer ID | BSC< -> MGW | O | C |
| Rate Reduction Information | BSC< -> MGW | O | R |

FIG.7

| Information Element | Element Direction | Type | |
|---|---|---|---|
| Message Type(Amp) | MGW <-> BSC | M | |
| Call Connection Reference | MGW <-> BSC | O | R |
| Mobile Identity(IMSI) | MGW <-> BSC | O | R |
| Mobile Identity(ESN) | MGW <-> BSC | O | C |
| A2p Bearer ID | MGW <-> BSC | O | C |
| Rate Reduction Information | MGW <-> BSC | O | R |
| Cause | MGW <-> BSC | O | C |

FIG.8

SYNCHRONIZATION METHOD AND SYSTEM FOR TRANSMITTING VOICE DATA IN A MOBILE COMMUNICATION SYSTEM

1. FIELD OF THE INVENTION

The present invention relates to a method and a system for transmitting data in a mobile communication system, and more particularly a synchronization method and a synchronization system for transmitting voice data in a mobile communication system which provides internet/multimedia services.

2. DESCRIPTION OF THE RELATED ART

Recently, with the rapid increase of the number of mobile communication subscribers, mobile communication services cooperate with Internet services, so that mobile stations have been developed to receive various types of data services, such as Internet services and multimedia services. Such a mobile communication system, that is, a code division multiple access mobile communication system (CDMA 2000 1x) will be described below with reference to an accompanying drawing.

FIG. 1 is a block diagram illustrating a structure of a conventional CDMA 2000 1x system.

The CDMA 2000 1x includes a mobile switching center (MSC) 30 and a packet data service node (PDSN) 40, in which the mobile switching center 30 switches voice and data transmitted/received from/to a mobile station to a relevant destination in cooperation with a base station 20 and in which the packet data service node 40 performs the function of an interface to exterior internet connections. In addition, the CDMA 2000 1x includes an interworking function (IWF) 50 and a packet control function (PCF) 60, in which the interworking function 50 converts circuit data and packet data into each other and transmits the converted data when the interworking function 50 receives a data transmission request from the mobile switching center 30, and in which the packet control function 60 is connected between the packet data service node 40 and the base station 20 to interface voice signals and data.

The base station 20 includes base transceiver stations (BTSs) 22A and 22B and a base station controller (BSC) 21 for controlling the base transceiver stations (BTSs) 22A and 22B.

An A1 interface and user information A2/A5 interfaces used for only circuit data are established between the mobile switching center 30 and the base station controller 21. Also, an A3 interface is provided in order to simultaneously transmit/receive a control signal and user data when selection of a reverse frame and transmission of a forward frame are conducted between the base station controller and another base station during soft handoff of a mobile station.

The base station controller 21 includes a trans-coder (or a vocoder) 23. The trans-coder (or vocoder) 23 functions to convert a wireless vocoder frame into a PCM vocoder frame, which is not a wireless vocoder but a representative wire vocoder, so as to transmit the wireless vocoder (e.g., EVRC, SMV, or Q-CELP) frame, which is transmitted from a mobile station through a radio section, to a wire concentrating network after the base station controller 21 receives the wireless vocoder frame. Since the conventional transmission line between a base station controller and a mobile switching center is a TDM line, a frame generated by a wireless vocoder of a mobile station cannot be transmitted between them. That is, a frame generated in a wireless vocoder having a used band less than 13 kbps is transmitted in a frame generated in the trans-coder of the base station controller, using all band of 64 kbps.

However, since the transmission line between the base station controller and the mobile switching center is formed in a TDM scheme as described above, there are problems of wasting bandwidth on such a TDM transmission line, dropping the efficiency of the transmission line, and increasing the cost for the TDM transmission line.

Moreover, since it is difficult to perform rapid transmission of packet data for internet/multimedia service in the conventional circuit-based system, a packet-based mobile communication system, such as an IP network, is recently developed. In the case in which the base station controller converts a voice signal using the trans-coder, as in the conventional system, in order to provide a fast packet data service, it is caused to waste band. Therefore, it is necessary to develop a new system.

SUMMARY OF THE INVENTION

Therefore, the present invention has been made in view of the above-mentioned problems and it is an object of the present invention to provide a next generation mobile communication system having a packet network, which is separated from a circuit network, so as to be suitable to a packet-based IP network.

Another object of the present invention is to provide a time synchronization method and a time synchronization system compensating for a time delay caused while a voice data frame is transmitted/received between a base station controller and a media gateway using a packet-based transmission scheme.

Still another object of the present invention is to provide a frame protocol capable of processing voice data frames when voice information is transmitted/received between a media gateway and a base station controller in an IP-based next-generation mobile communication system.

According to an aspect of the present invention, there is provided a method for synchronizing transmission/reception time for delay in transmission/reception of a data frame of a voice signal in a mobile communication system which includes a media gateway and a base station controller, the media gateway including a trans-coder for converting an analog voice signal and a coded digital voice signal into each other, the base station controller transmitting/receiving a digital voice signal to/from the media gateway, the method comprising the steps of: transmitting information of a forward delay and data frames of a voice signal, which is received from the mobile station, from the base station controller to the media gateway; transmitting information of a reverse delay from the media gateway to the base station controller lichen the media gateway receives data frames of voice signals from a called party; and receiving the information of the forward delay and the reverse delay and performing a control for the synchronization in the base station controller and the media gateway, respectively.

According to another aspect of the present invention, there is provided a method for synchronizing transmission/reception time by a base station controller for delay in transmission/reception of a data frame of a voice signal in a mobile communication system which includes a media gateway and the base station controller, the media gateway including a trans-coder for converting an analog voice signal and a coded digital voice signal into each other, the base station controller transmitting/receiving a digital voice signal to/from the media gateway, the method comprising the steps of: checking whether or not forward data frames of the voice signal received from the media gateway are synchronized; appointing information of a forward delay when the forward voice data frames are not synchronized, and notifying the media gateway of the appointed forward delay information and a reverse data frame of a voice signal received from a mobile station; requesting time synchronization to the media gateway when synchronization is not established for the forward voice data frames received in sequence; receiving information of transmission timing adjusted by the media gateway according to the time synchronization request; and synchronizing the forward voice data frames using the transmission timing information and transmitting the forward voice data frames to the mobile station.

According to still another aspect of the present invention, there is provided a method for synchronizing transmission/reception time by a media gateway for delay in transmission/reception of a data frame of a voice signal in a mobile communication system which includes the media gateway and a base station controller, the media gateway including a trans-coder for converting an analog voice signal and a coded digital voice signal into each other, the base station controller transmitting/receiving a digital voice signal to/from the media gateway, the method comprising the steps of: checking whether or not reverse data frames of the voice signal received from the base station controller are synchronized; appointing information of a reverse delay when the reverse voice data frames are not synchronized, and notifying the base station controller of the appointed reverse delay information and a forward data frame of a voice signal; receiving a synchronization request from the base station controller when synchronization is not established for the reverse voice data frames received in sequence; adjusting transmission timing of the reverse voice data frame according to the synchronization request, and transmitting the adjusted information to the base station controller; and receiving the reverse voice data frame synchronized according to the adjusted transmission timing information from the base station controller.

According to still another aspect of the present invention, there is provided a system for synchronizing transmission/reception time for delay in transmission/reception of a data frame of a voice signal in a mobile communication system which includes a media gateway and a base station controller, the media gateway including a trans-coder for converting an analog voice signal and a coded digital voice signal into each other, the base station controller transmitting/receiving a digital voice signal to/from the media gateway, The system comprising: the base station controller for transmitting information of a forward delay and data frames of a voice signal, which is received from the mobile station, to the media gateway, receiving the information of the forward delay and the reverse delay, and performing a control for the synchronization; and the media gateway for transmitting information of a reverse delay to the base station controller when the media gateway receives data frames of voice signals from a called party, receiving the information of the forward delay and the reverse delay, and performing a control for the synchronization.

BRIEF DESCRIPTION OF THE DRAWINGS

The foregoing and other objects, features and advantages of the present invention will become more apparent from the following detailed description when taken in conjunction with the accompanying drawings in which:

FIG. 3 illustrates a protocol stack of a CDMA 2000 1x system according to an embodiment of the present invention, FIG. 4A illustrates an A2p reverse frame message of a frame protocol according to an embodiment of the present invention;

FIG. 4B illustrates information of 'reverse layer-3 data' from among the A2p reverse frame message shown in FIG. 4A;

FIG. 5A illustrates an A2p forward frame message of a frame protocol according to an embodiment of the present invention;

FIG. 5B illustrates information of 'forward layer-3 data' from among the A2p forward frame message information shown in FIG. 5A;

FIG. 6A illustrates information of a frame protocol control procedure of A2p reverse/forward frame messages according to an embodiment of the present invention;

FIG. 6B illustrates time synchronization information of A2p reverse/forward frame messages according to an embodiment of the present invention;

FIG. 6D illustrates failure cause information elements;

FIG. 7 illustrates a time synchronization message of a frame protocol when out-of-signaling is used according to an embodiment of the present invention;

FIG. 8 illustrates a time synchronization response message of a frame protocol when out-of-signaling is used according to an embodiment of the present invention;

DETAILED DESCRIPTION OF THE PREFERRED EMBODIMENT

Reference will now be made in detail to the preferred embodiments of the present invention. In the following description of the present invention, a detailed description of known functions and configurations incorporated herein will be omitted when it may make the subject matter of the present invention unclear.

According to a next-generation mobile communication system of the present invention, the conventional mobile switching center is divided into a mobile switching center emulator (MSCe or media gateway control (MGC)) and a media gateway (MGW), in which the MSC emulator takes charge of a call control and a mobility control. The media gateway takes charge of converting voice data from an analog signal/digital signal into a digital signal/analog signal and forwarding the converted data. Therefore, a bearer interface for transmitting voice information between a mobile switching center and a base station controller in the prior art corresponds to an interface between the media gateway and a base station controller in the present invention. In addition, a frame protocol capable of checking packet arrival sequence and a transmission state between the media gateway and the base station controller is newly established so as to transmit voice information to be transmitted/received from/to a mobile station. Also, the next-generation mobile communication system of the present invention is an LMSD (Legacy MS Domain) system of a CDMA (Code Division Multiple Access) 2000 1x, and is shown in a network reference model between a radio access network (RAN) and a core network (CN). Such a next generation mobile communication system (hereinafter, referred to as "CDMA 200 1×") will be described in detail with reference to the accompanying drawings.

Figure 1:
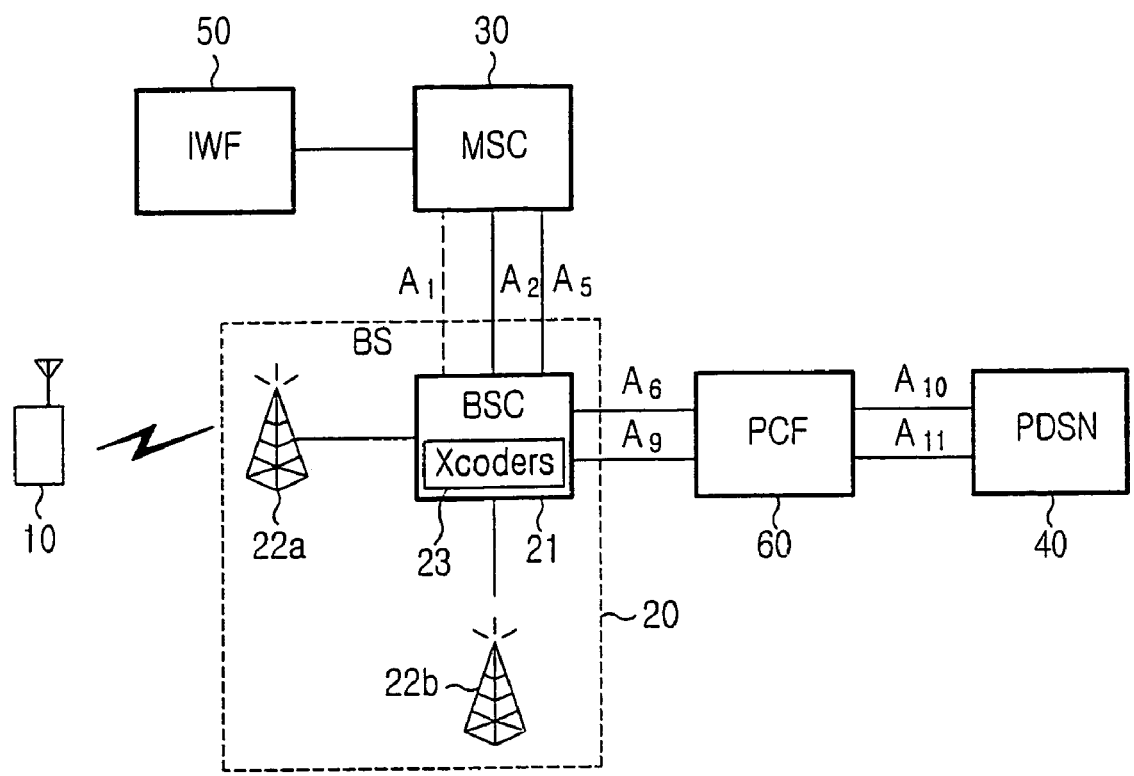
FIG. 1 is a block diagram illustrating a structure of a conventional CDMA 2000 1x system.
Figure 2:
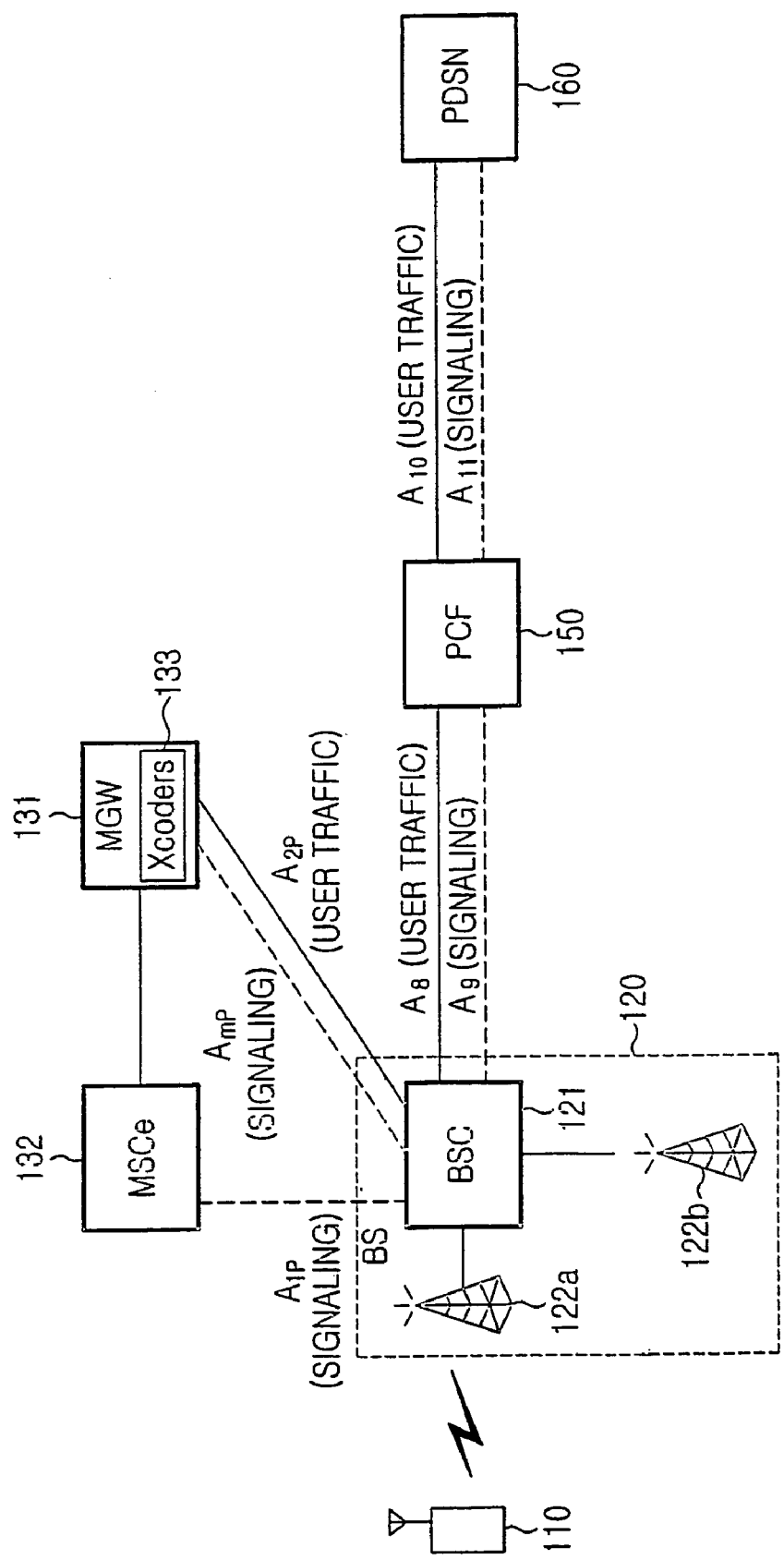
FIG. 2 is a block diagram illustrating a structure of a CDMA 2000 1x system according to an embodiment of the present invention.

FIG. 2 is a block diagram illustrating a structure of a CDMA 2000 1x system according to an embodiment of the present invention.

As shown in FIG. 2, the CDMA 2000 1x system includes a base station controller 121, a media gateway 131, a mobile switching center emulator (MSC emulator) 132, a packet data service node (PDSN) 160, and a packet control function (PCF) 150.

The media gateway 131 cooperates with the base station controller 121, and includes a trans-coder 133 for converting an analog voice signal and a digital signal into each other. The trans-coder 133 performs a forward operation which converts a voice data frame, which is transmitted from a normal wire telephone, into a wireless vocoder frame used in a mobile station, using a pulse code modulation (PCM) scheme. Also, the trans-coder 133 performs a reverse operation which converts voice data generated by the wireless vocoder of the mobile station into PCM voice data of 64 kbps, using a pulse code modulation (PCM) scheme. That is, the trans-coder 133 performs a coding operation at a reduced transmission rate when there is no voice signal, and the trans-coder 133 performs a coding operation at a maximum transfer rate when there are a large number of voice signals.

The MSC emulator 132 exchanges a call control signal and a mobility control signal, that is, signals for controlling the media gateway 131.

The packet control function 150 cooperates with the packet data service node 160 which is connected to an exterior internet. The packet control function 150 controls and manages handoffs, and manages packet data service profiles of mobile stations.

The base station controller 121 and the media gateway 131 are connected with each other through an A1p interface which corresponds to the normal A1 interface and through an A2p interface which corresponds to the conventional A2 interface. Also, an Amp interface is established between the base station controller 121 and the media gateway 131 to perform out-of-band signaling for the purpose of establishing, maintaining, and managing a bearer. The functions defined for the Amp interface may be performed by in-band signaling in the frame protocol of the A2p interface. Such the A1p, A2p, and Amp interfaces are not normal circuit-based interfaces but packet-based, (ATM or IP) interfaces.

An example of a protocol stack which is defined in an interface between the base station controller and the media gateway will be described below with reference to FIG. 3.

In the protocol stack, "Case 1" applied to the present invention will be described, but the description of "Case 2" will be omitted.

In the protocol stack of the A2p interface, RTP* (Real time Transport Protocol*) and GRE* (Generic Route Encapsulation*) have functions somewhat modified from those of the conventional RTP and GRE, respectively. This means that it is unnecessary that the RTP* and GRE* require all functions, which includes a function of multiplexing data of multiple users with a single port, of the conventional RTP and GRE.

The Amp interface is an interface for out-of-band signaling in a control process provided by the frame protocol, and is established as a separate interface. When, the Amp interface is matched with the media gateway via the MSC emulator, an SCTP (Session Control Transmission Protocol) of the protocol stack is used.

The frame protocol defined in the above-mentioned protocol stack will be described below. When voice information is transmitted/received between the media gateway and the base station controller, the frame protocol operating on the RTP or the GRE provides a procedure for processing a voice data frame and a control procedure thereof. The principal functions of the frame protocol are as follows.

First, the frame protocol has a function of forming and transmitting a frame before voice data information is transmitted, and a function of dividing a frame into control information and voice data information to analyze the divided information after the relevant frame is received.

Second, the frame protocol has an initialization function which includes a function of appointing quality of service (QoS) of a transmission line before voice data are transmitted between the base station controller and the media gateway and a function of appointing the number of a transmitted/received frame when the frame is transmitted/received.

Third, the frame protocol has a function of establishing and maintaining synchronization during actual transmission/reception through a report of delay so as to solve a delay problem caused when voice data information is transmitted/received in real time.

Fourth, the frame protocol has a vocoder transmission control function of changing the transmission rate and the transmission mode of a vocoder included in the media gateway so as to be matched with a vocoder of a mobile station when the transmission rate and the transmission mode of the vocoder included in the mobile station are changed.

Fifth, the frame protocol has a function of controlling a transmission rate of voice data transmitted from the media gateway at a specific time so as to multiplex a signaling message and supplementary data (secondary traffic), which are generated in a DB (Dim and Burst) scheme or a BB (Blank and Burst) scheme in the base station controller, and to transmit the multiplexed data to a mobile station.

In the present invention, the third function from among the above-mentioned functions of the frame protocol, that is, a method for synchronizing frame transmission/reception time, will be described. First, a frame protocol established for synchronization will be described with the accompany drawings.

FIG. 4A illustrates an A2p reverse frame message of a frame protocol for time synchronization according to an embodiment of the present invention and FIG. 4B illustrates information of 'reverse layer-3 data' from among the A2p reverse frame message information shown in FIG. 4A.

Referring to FIG. 4A, the reverse frame message (A2p Frame_Reverse) is a message to be transmitted from the base station controller to the media gateway and necessarily includes information related to message type and message error check (Message CRC). In addition, the reverse frame message selectively includes reverse layer-3 data information, frame protocol, control procedure information, time synchronization information, and failure cause information. The reverse layer-3 data information elements are elements of information transmitted to reduce a transmission rate for the purpose of performing multiplexing on the A2p interface when in-band signaling is performed. Such reverse layer-3 data information elements will now be described with reference to FIG. 4B.

"Codec Indicator" represents information related to a codec which is currently in use. As shown in Table 1 below, a codec indicator value of "000" represents a codec of an EVRC (Enhanced Variable Rate Coding) scheme, a codec indicator value of "001" represents a codec of an SMV (Selectable diode Vocoder) scheme, codec indicator values of "010" and "011" represents codecs of 13K and 8K Q-CELP (Qualcom Code Excited Linear Prediction) coding schemes, respectively, and a codec indicator value of "100" represents a codec of AMR (Adaptive Multi-Rate) coding scheme. Codec indicator values of "101" to "111" are reserved values.

TABLE 1

| Codec Indicator value | Meaning |
| --- | --- |
| 000 | EVRC |
| 001 | SMV |
| 010 | 13K Q-CELP |
| 011 | 8K Q-CELP |
| 100 | AMR |
| 101~111 | Reserved |

"Frame Sequence Number (FSN)" represents information appointed by a value obtained by performing a modulo-operation with sixteen for a value representing system time according to frames by the base station controller. The value obtained through the modulo-operation may represent a point of time at which the base station controller receives a frame backwardly from the base transceiver station.

"Rate Reduction Required" represents information of indicating that a signaling message to be transmitted from the base station controller is in a rate control time interval. If there is a signaling message to be transmitted, the value of "Rate Reduction Required" is set as "1", and if not, the value is set as "0".

"Required Reduced Frame Number" re presents information related to the number of 20 ms frames required to be reduced for reducing a transmission rate when a signaling message to be transmitted from the base station controller must be multiplexed through multiple 20 ms frames to be transmitted. That is, it may be required to reduce as many forward frames as the value of the "Required Reduced Frame Number", which is shown in Table 2.

TABLE 2

| Required Reduced Frame Number Value | Meaning |
| --- | --- |
| 00 | One 20 ms frame |
| 01 | Two 20 ms frames |
| 10 | Three 20 ms frames |
| 11 | Four 20 ms frames |

"Rate Required" is a field of indicating that the base station controller is in a rate introduction time interval. If there is a signaling message to be transmitted, the value of "Rate Reduction Required" is set as "1", and if not, the value is set as "0".

"BB Indicator" is a Blank and Bust indicator. If the base station controller requires a BB scheme so as to transmit a signaling message or supplementary data, the value of "BB indicator" is set as "1", and if not, the value is set as "0" which indicates the Dim and Burst scheme.

"Data Inclusion" is a field of indicating whether or not a signaling message or secondary traffic to be multiplexed and transmitted by the base station controller will be inserted into the current frame protocol reverse data to be transmitted. If a signaling message or supplementary data are inserted, the value of "Data Inclusion" is set as "1", and if not, the value is set as "0". When the value of "Data Inclusion" is set as "1", a signaling message or supplementary data corresponding to a value set in a "Length" field are inserted.

"Rate Reduction Time Interval" is a field of indicating a time interval during which the base station controller desires to transmit a signaling message or secondary traffic. The values of the "Rate Reduction Time Interval" are in a range of values which are set at intervals of 20 ms from a point of time set in the "FSN (Frame Sequence Number)" field. That is, the respective values of "Rate Reduction Time Interval" represent one of a range of "a value (decimal) of Rate Reduction Time Interval×20 ms", and a range has a time interval of 320 ms from CDMA System Time represented in "FSN".

"Scaling" represents a time scale set for values of a packet arrival time error (PATE) by the base station controller. The values of "Scaling" are shown in Table 3.

TABLE 3

| Scaling Field Value | Time Units | PATE Range |
| --- | --- | --- |
| 00 | 0.125 ms | ±3.875 ms |
| 01 | 1.0 ms | ±31.0 ms |
| 10 | 1.25 ms | ±38.75 ms |
| 11 | 5.0 ms | ±155 ms |

The packet arrival time error (PATE) represents a difference between a reception time in which the base station controller actually receives FP-Forward Layer-3 Data (Frame Protocol-Forward Layer-3 Data) and an expected arrival time calculated by the "Scaling" field. Therefore, the ranges of the PATE are expressed using "±" and are established as shown in Table 3 according to values set in the "Scaling" field.

"Frame Content" is a field of indicating the number of information bits and a code symbol repetition rate which are included in actual FP-forward layer-3 data information. Types of frames used for in-band signaling between the base station controller and the media gateway are shown in Tables 4 and 5 below. Table 4 shows "Frame Content-Special Frame Contents Parameters" and Table 5 shows "Frame Content-Frame Contents Parameters".

TABLE 4

| Frame Content | | Description | |
| --- | --- | --- | --- |
| (hex) | Name | Forward | Reverse |
| 00 | Idle' | Transmitted for frame synchronization between BSC and MGW before establishment of wireless resource | Transmitted for frame synchronization between BSC and MGW before establishment of wireless resource |
| 7C | Blank' | Transmitted when being used in Blank and Burst | Transmitted when used in Blank and Burst |
| 7D | Full Rate Likely | Not Applicable | Radio Configuration 1, Full Rate Likely |
| 7E | Erasure/ | Not Applicable | Insufficient Physical Layer Frame Quality |
| 7F | Null' | Used during DTX mode (When transmitting Null traffic frames to the MS) | Used during DTX mode (When there is only a pilot channel and no frames are being received on the traffic channel) |

TABLE 5

| Frame Content (hex) | Radio Configuration | Data Rate (bps) | Number of Layer 3 Fill Bits | Number of Information Bits |
|---|---|---|---|---|
| 01 | Forward: 1 | 9600 | 4 | 172 |
| 02 | and | 4800 | 0 | 80 |
| 03 | Reverse: 1 | 2400 | 0 | 40 |
| 04 |  | 1200 | 0 | 16 |
| 05 | Forward: 2 | 14400 | 4 | 268 |
| 06 | and | 7200 | 3 | 125 |
| 07 | Reverse: 2 | 3600 | 1 | 55 |
| 08 |  | 1800 | 3 | 21 |
| 09 | Forward: | Unused | — | — |
| 0A | 3, 4, 6, 7 and | 9600 (20 ms) | 4 | 172 |
| 0B | Reverse: 3, 5 | 4800 | 0 | 80 |
| 0C |  | 2700 | 0 | 40 |
| 0D |  | 1500 | 0 | 16 |
| 0E | Forward: 5, 8, 9 | Unused | — | — |
| 0F | and | 14400 | 5 | 267 |
| 10 | Reverse: | 7200 | 3 | 125 |
| 11 | 4, 6 | 3600 | 1 | 55 |
| 12 |  | 1800 | 3 | 21 |

"Length" contains information about a length of bytes included after the "Length" field.

"Signaling message/Secondary Traffic" represents an inserted signal message or supplementary data (secondary traffic) when the value of "Signaling message/Secondary Traffic" is set as "1".

Also, the forward layer-3 data information may selectively includes forward-link information elements (Forward Link Information+Layer-3 fill) in addition to the above-mentioned information elements.

During the performance of a frame protocol control procedure, when data are processed using in-band signaling on the A2p interface, the media gateway transmits an A2p forward frame message to a base station. Information elements of the A2p forward frame message will be described below.

FIG. 5A illustrates an A2p forward frame message of a frame protocol for synchronization according to an embodiment of the present invention, and FIG. 5B illustrates information of 'forward layer-3 data' from among the A2p forward frame message information shown in FIG. 5A.

In in-band signaling, user data (e.g., a voice data frame) are transmitted together with control information (signaling message and/or supplementary data) of a frame protocol through the same message. When in-band signaling is used for synchronization, a message format of a frame protocol, as shown in FIG. 5A, necessarily includes information of message type and message error check (Message CRC). In addition, the message format of the frame protocol selectively includes forward layer-3 data information, frame protocol processing information, and time synchronization information. Elements of such forward layer-3 data information will now be described with reference to FIG. 5B.

"Codec Indicator" is a field of indicating information related to a codec which is currently in use. The codec information is discriminated according to values of the codec indicator in the same manner as in the codec information of reverse layer-3 data shown in Table 1.

A transmission-rate control acknowledgment (Rate_Reduction_Ack) is a response field to a transmission-rate reduction request of the base station controller for a DB (Dim and Burst) scheme. If the transmission-rate reduction request is acknowledged to reduce a transmission rate of a relevant frame, the value of "Rate_Reduction_Ack" is set as "1", and if not or as a basic value, the value is set as "0".

"Frame Sequence Number (FSN)" is a field appointing a value obtained by performing a modulo-operation with sixteen for a value representing system time according to frames by the media gateway. The value obtained through the modulo-operation may be used as a forward transmission time from the base station controller to the base transceiver station.

"Scaling" is a field in which the media gateway sets a time scale for values of a packet arrival time error (PATE). The values of "Scaling" are the same as those shown in Table 3.

The packet arrival time error (PATE) is a field of indicating a difference between a reception time in which the media gateway actually receives RP-Forward Layer-3 Data (Reverse Protocol-Forward Layer-3 Data) and an expected arrival time calculated by the "Scaling" field. Therefore, the ranges of the PATE are expressed using "±", and are established as shown in Table 3 according to values set in the "Scaling" field.

"Frame Content" is a field of indicating the number of information bits and a code symbol repetition rate. Types of frames used for in-band signaling between the base station controller and the media gateway are same as those shown in Tables 4 and 5.

Also, the forward layer-3 data information may selectively includes forward-link information elements (Forward Link Information+Layer-3 fill) in addition to the above-mentioned information elements.

Frame protocol control procedure information of the A2p reverse/forward frame message will now be described with reference to FIG. 6A.

In the frame protocol control procedure information, a frame protocol control number is a filed of indicating the number of a frame in which a frame protocol control type is assigned.

"FP_Mode" represents a frame protocol mode. If the frame protocol mode (FP_Mode) is "0", a transparent mode, in which a user or another devices cannot recognize an object, is enabled. If the frame protocol mode (FP_Mode) is "1", a non-transparent mode is enabled. In a case of the transparent mode, the message of the frame protocol is instantly transmitted without being processed. In a case of the non-transparent mode, the message of the frame protocol is transmitted after the frame protocol has been processed. The transparent mode is available when the media gateway's role is that of a multimedia gateway. That is, the frame protocol is not applied to a message in a case in which the message is used while a VOIP call controlled by an SIP call on an IP layer is transmitted from the media gateway to a base station (RAN). The transparent mode is selected to be operated when a MEGACO (media gateway control) message is received from a mobile switching center (MSC) server and the non-transparent mode is selected to be operated when a MEGACO (media gateway control) message is received from another media gateway control function (MGCF).

"Ack/Nack" represents values of Ack and Nack for a message determined in a frame protocol control type.

"Frame_Protocol_Control_Procedure" represents a control status for the frame protocol included in a transmitted message. Values of the "Frame_Protocol_Control_Procedure" are shown in Table 6.

TABLE 6

| Frame_Protocol_Control_Procedure value | Meaning |
|---|---|
| 000 | Initialization |
| 001 | Time Synchronization |

TABLE 6-continued

| Frame_Protocol_Control_Procedure value | Meaning |
|---|---|
| 010 | Rate Control |
| 011 | Mode Control |
| 100~111 | Reserved |

As shown in Table 6, information elements, such as initialization information, time synchronization information, rate control information, vocoder mode control information and the like, are selectively inserted into A2p forward and reverse frame messages according to values set in the "Frame_Protocol_Control_Procedure".

FIG. 6B shows a construction of time synchronization information added to the A2p forward/reverse frame messages when the frame protocol control procedure field is established for time synchronization.

"Start of FSN (Frame Sequence Number)" is a field of representing a start FSN which measured as time synchronization information elements. "End of FSN (Frame Sequence Number)" is a field of representing an end FSN which measured as time synchronization information elements. "Number of Lost Frames" is a field for appointing the number of lost frames from the start FSN to the end FSN. The appointed value means the number of lost frames.

"Scaling" is a field for appointing time scale for a value of the packet arrival time error (PATE) in a party which receives a frame, values of the "Scaling" field is shown in Table 7 below.

TABLE 7

| Scaling Field Value | Time Units | PATE Range |
|---|---|---|
| 00 | 10 ms | ±10 ms |
| 01~11 | Reserved | Reserved |

The packet arrival time error (PATE) represents a difference between a reception time in which the reception party actually receives a frame and an expected arrival time calculated by the "Scaling" field. Therefore, the ranges of the PATE are expressed with "±" and are established as shown in Table 7 according to values appointed in the "Scaling" field.

Figure 6C:
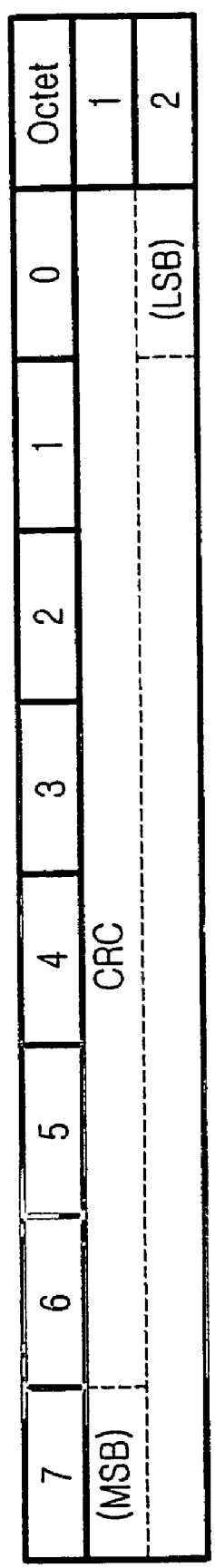
FIG. 6C illustrates failure cause information of A2p reverse/forward frame messages according to an embodiment of the present invention.

FIG. 6C is a format of representing information of message error check which is included in A2p reverse/forward frame messages of a frame protocol according to an embodiment of the present invention.

The message error check has standard 16-bit information which is applied to forward/reverse layer-3 data and a message type, and checks a relevant message and a layer-3 data information element. For such a checking, a generator polynomial "$g(x)=X^{16}+X^{12}+X^{5}+1$" is used.

FIG. 6D is a format of representing failure cause information elements which are inserted into an A2p frame protocol reverse/forward frame. Failure cause values occurring between the base station controller and the media gateway are shown in Table 8 below. Referring to Table 8, it can be understood that a cause value of failure to synchronize voice data transmitted according to an embodiment of the present invention is "011".

TABLE 8

| Binary Values | Meaning |
|---|---|
| 000 | Normal Event |
| 001 | Normal Event |
| 010 | Initialization is unavailable |
| 011 | Time Synchronization is unavailable |
| 100 | Rate Control is unavailable |
| 101 | SMV Mode Control is unavailable |
| 110~111 | Reserved |

The following description will be given of information elements for a synchronization request message (Amp-Time Synchronization) and a synchronization acknowledgment message (Amp-Time Synchronization Ack), which are individually transmitted through the Amp interface, when out-of-band signaling is used during the performance of a frame protocol control procedure.

FIG. 7A illustrates an Amp synchronization request message of a frame protocol for synchronization according to an embodiment of the present invention.

"Message Type" is one-byte information representing a frame message transmitted through the Amp interface. "Call Connection Reference" is information representing a voice call connection number of a relevant mobile station on the base station controller and the media gateway, relevant fields of which is shown in Table 9.

TABLE 9

| 7 | 6 | 5 | 4 | 3 | 2 | 1 | 0 | Octet |
|---|---|---|---|---|---|---|---|---|
| | | | Amp Element Identifier | | | | | 1 |
| | | | Length | | | | | 2 |
| (MSB) | | | Market ID | | | | | 3 |
| | | Market ID (continued) | | | | | (LSB) | 4 |
| (MSB) | | | Generating Entity ID | | | | | 5 |
| | | Generating Entity ID (continued) | | | | | (LSB) | 6 |
| (MSB) | | | | | | | | 7 |
| | | | Call Connection Reference Value | | | | | 8 |
| | | | | | | | | 9 |
| | | | | | | | (LSB) | 10 |

Referring to Table 9, information of "Call Connection Reference" includes a "Length" field, a two-byte "Market ID" field which represents a market ID established by a service provider, a two-byte code number (Generating Entity ID) field which represents a code number assigned from a service provider to a device which generates a value of a call connection number, and a four-byte "Call Connection Reference Value" field which represents a value to be used for discriminating whether or not a relevant mobile station transmits voice data.

"Mobile Identity" (e.g., IMSI or ESN) is information representing the number of a relevant mobile station, and includes a "Length" field and a "Type of Identity" field. Fields of the mobile identity are shown in Table 10 below.

TABLE 10

| 7 | 6 | 5 | 4 | 3 | 2 | 1 | 0 | Octet |
|---|---|---|---|---|---|---|---|---|
| | | | A9 Element Identifier | | | | | 1 |
| | | | Length | | | | | 2 |
| | Identity Digit 1 | | | Odd/even Indicator | | Type of Identity | | 3 |
| | Identity Digit 3 | | | | Identity Digit 2 | | | 4 |
| | ... | | | | ... | | | ... |
| | Identity Digit N + 1 | | | | Identity Digit N | | | k |

The "Type of Identity" field represents various kinds of identities for mobile stations as shown in Table 11.

TABLE 11

| Binary Values | Meaning |
| --- | --- |
| 000 | No Identity Code |
| 010 | Broadcast Address |
| 101 | ESN |
| 110 | IMSI |

"A2p bearer ID" represents information related to a bearer ID used to transmit voice data between the base station controller and the media gateway, and indicates a port number of an RTP/UDP/IP or a GRE/IP.

FIG. 8 is a format of showing a time synchronization response message when out-of-band signaling of the frame protocol is used according to an embodiment of the present invention.

"Message type" is 1 byte information of representing a message type (Amp message type) of an Amp interface. The "Message type" is configured as shown in Table 12, and a relevant synchronization Ack number is a value to be later appointed.

TABLE 12

| 7 | 6 | 5 | 4 | 3 | 2 | 1 | 0 | Octet |
| --- | --- | --- | --- | --- | --- | --- | --- | --- |
| Amp Message Type | | | | | | | | 1 |

Cause information elements are identical to cause information elements shown in FIG. 6D. The Cause information elements are provided when the synchronization request message (Amp-Time Synchronization) is not accepted. Remaining information elements of the Cause information elements are identical to those of the synchronization request message (Amp-Time Synchronization).

A description will be given of a time synchronization method in a voice data transmission section between the base station controller and the media gateway in the CDMA 2000 1x constructed as described above. The time synchronization methods will be described/with respect to cases of an in-band signaling procedure and an out-of-band signaling procedure, respectively.

First, a description will be given with respect to a time synchronization method in the case of using the in-band signaling, in which a control message is included in a transmission frame of a frame protocol and is transmitted together with the transmission frame, with reference to the accompanying drawing.

Figure 9:
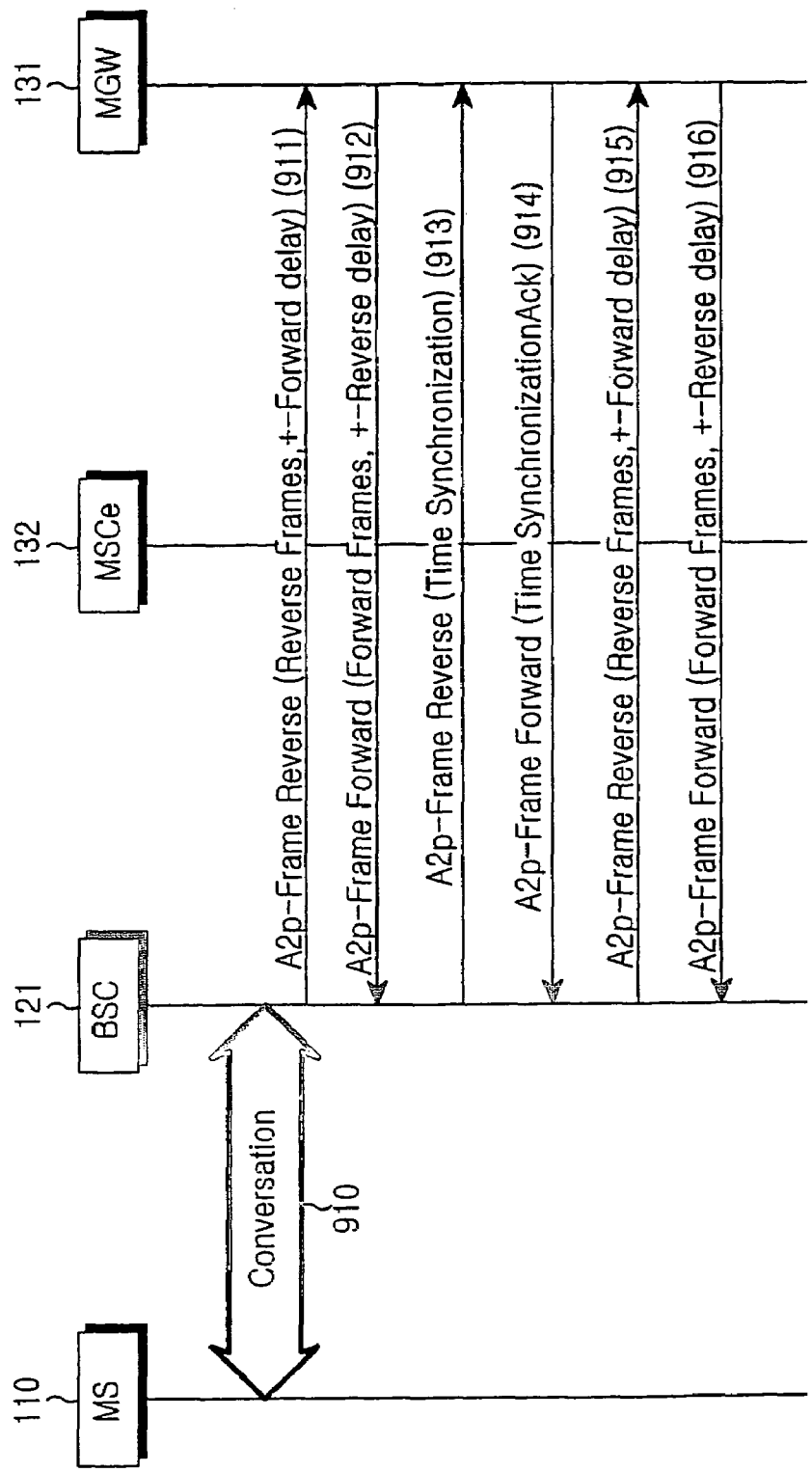
FIG. 9 is a flowchart illustrating a call procedure for time synchronization using in-band signaling between a base station controller and a media gateway according to an embodiment of the present invention.

FIG. 9 is a flowchart illustrating a call processing procedure for transmission/reception time synchronization of voice data in the in-band signaling according to an embodiment of the present invention.

In step 910, a mobile station 110 establishes a session with a base station controller 121, and then performs voice communication with a called party.

In step 911, the base station controller 121 inserts a transmission rate and information bits of voice data received from the mobile station 110 through a voice data frame into an A2p reverse frame message. The A2p reverse frame message is then transmitted to a media gateway 131. At this time, the base station controller 121 appoints a difference value between an actual arrival time of an A2p forward frame message previously received from the media gateway 131 and an expected arrival time as a value in a PATE information according to unit time of scaling, and then transmits the PATE information to the media gateway 131.

In step 912, the media gateway 131 inserts information bits and a transmission rate of voice data, which are received through a voice data frame from a media gateway of the called party (which is not shown), into an A2p forward frame message, and then transmits the A2p forward frame message to the base station controller 121. At this time, the media gateway 131 appoints a difference value between the actual arrival time of an A2p reverse frame message previously received from the base station controller 121 and an expected arrival time as a value in a PATE information according to unit time of scaling, and transmits the PATE information to the base station controller 121.

In step 913, the base station controller 121 inserts time synchronization control procedure information to request time synchronization into an A2p reverse frame message, and transmits the A2p reverse frame message to the media gateway 131.

In step 914, the media gateway 131 performs a time synchronization control for the relevant mobile station 110. Then, the media gateway 131 inserts a time synchronization response into an A2p forward frame message and transmits the A2p forward frame message to the base station controller 121.

In step 915, the base station controller 121 a transmission rate and information bits of voice data to be transmitted into an A2p reverse frame message and transmits the A2p reverse frame message to the media gateway 131. At this time, the base station controller 121 appoints a difference value between the actual arrival time of an A2p forward frame message previously received from the media gateway 131 and an expected arrival time as a value in a PATE information according to unit time of scaling, and then transmits the PATE information to the media gateway 131.

In step 916, the media gateway 131 inserts information bits and a transmission rate of voice data received through a voice data frame from a media gateway of the called party into an A2p forward frame message, and then transmits the A2p forward frame message to the base station controller 121. At this time, the media gateway 131 appoints a difference value between the actual arrival time of a previous A2p reverse frame message and an expected arrival time as a value in a PATE information according to unit time of scaling, and then transmits the PATE information to the base station controller 121.

The above description has shown the call processing operations for transmission/reception time synchronization of voice data using the in-band signaling, in which a control message is transmitted with a transmission frame of the frame protocol according to an embodiment of the present invention. Hereinafter, a description will be given with respect to call processing operations for transmission/reception time synchronization of voice data using the out-of-band signaling, in which a control message is transmitted individually through a separate signaling interface (hereinafter, referred to as "Amp"), according to another embodiment of the present invention.

Figure 10:
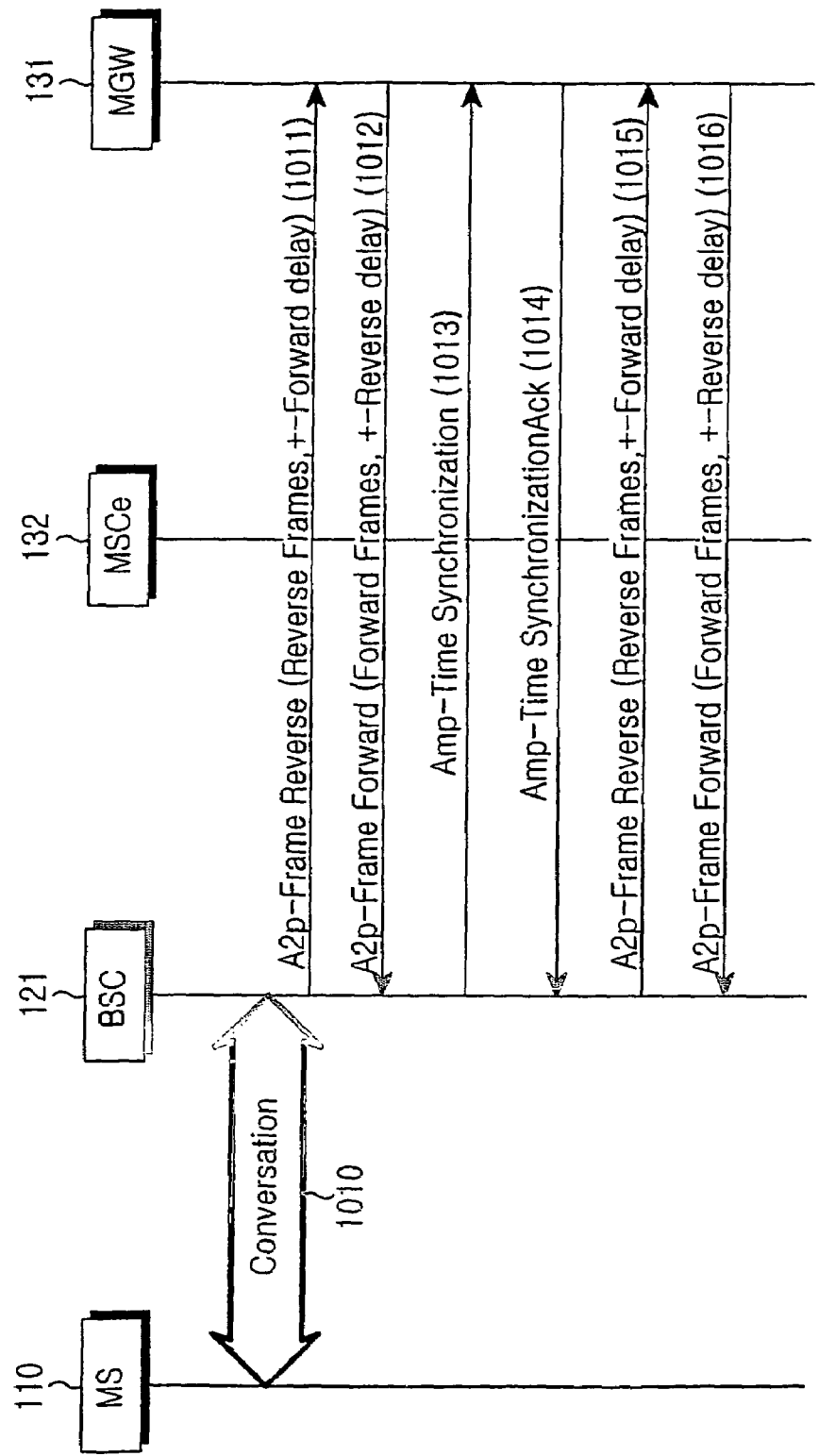
FIG. 10 is a flowchart illustrating a call procedure for time synchronization using out-of-band signaling between a base station controller and a media gateway according to another embodiment of the present invention.

FIG. 10 is a flowchart illustrating a call processing procedure for transmission/reception time synchronization of voice data in the out-of-band signaling according to another embodiment of the present invention.

In step 1010, a mobile station 110 establishes a session with a base station controller 12.1, and then performs voice communication with a called party.

In step 1011, the base station controller 121 inserts a transmission rate and information bits of voice data included in a received voice data frame into an A2p reverse frame message, and then transmits the A2p reverse frame message to a media gateway 131. At this time, the base station controller 121 appoints a difference value between the actual arrival time of an A2p forward frame message previously received from the media gateway 131 and an expected arrival time as a PATE value corresponding to unit time of scaling, and then transmits the PATE information to the media gateway 131.

In step 1012, the media gateway 131 inserts information bits and a transmission rate of voice data, which is received through a voice data frame from a media gateway of the called party (which is not shown), into an A2p forward frame message, and transmits the A2p forward frame message to the base station controller 121. At this time, the media gateway 131 appoints a difference value between the actual arrival time of a reverse layer-3 data information of an A2p reverse frame message previously received from the base station controller 121 and an expected arrival time, which is calculated in a scaling field within the reverse layer-3 data information, as a value of the PATE field according to unit time of scaling, and transmits the PATE information to the base station controller 121.

In step 1013, when delay of the A2p forward frame message received from the media gateway 131 continuously occurs, or when the width of the delay is large, or when an error of the frame number of the A2p forward frame message occurs, the base station controller 121 an Amp time synchronization message to request time synchronization to the media gateway 131.

In step 1014, the media gateway 131 performs a time synchronization control to a relevant mobile station, and then transmits an Amp time synchronization acknowledgment message (Amp-Time Synchronization Ack) to the base station controller 121.

In step 1015, the base station controller 121 transmits an A2p reverse frame message to the media gateway 131 as the same manner as those performed in step 1011. Subsequently, in step-1016, the media gateway 131 transmits an A2p forward frame message to the base station controller 121 as the same manner as those performed in step 1012.

The above-mentioned time synchronization procedure is controlled by a party of receiving a frame, that is, by the base station controller in a case of a forward link, or by the media gateway in a case of a reverse link. The time synchronization procedure is classified broadly into two schemes. According to the first scheme, when it is checked that each protocol data unit (PDU) of the forward and reverse frame protocols is not received at an appropriate time to the base station controller and the media gateway and thus an unnecessary buffer delay is caused, the time synchronization procedure starts whenever the arrival sequence of voice data frames is wrong. According to the second scheme for the time synchronization procedure, actual voice data are compensated for a transmission delay every 20 ms frame unit. In the first scheme, a control frame is transmitted for synchronous compensation. The first scheme is used when an unnecessary buffer delay occurs over a predetermined period of time, or when initial synchronization must be sequentially accomplished. For example, such a scheme is used when a bearer transmission termination point of a base station controller is not changed while a bearer transmission termination point of a media gateway is changed during a hard handoff. In contrast, according to the second scheme, a control field of a data frame is used to compensate for delay time, and such a scheme is used when frames ate transmitted/received every 20 ms.

Hereinafter, a description will be given for success and failure procedures of a call procedure for transmission/reception time synchronization of voice data transmitted/received between a base station controller and a media gateway using the frame protocol, employing the first scheme.

Figure 11:
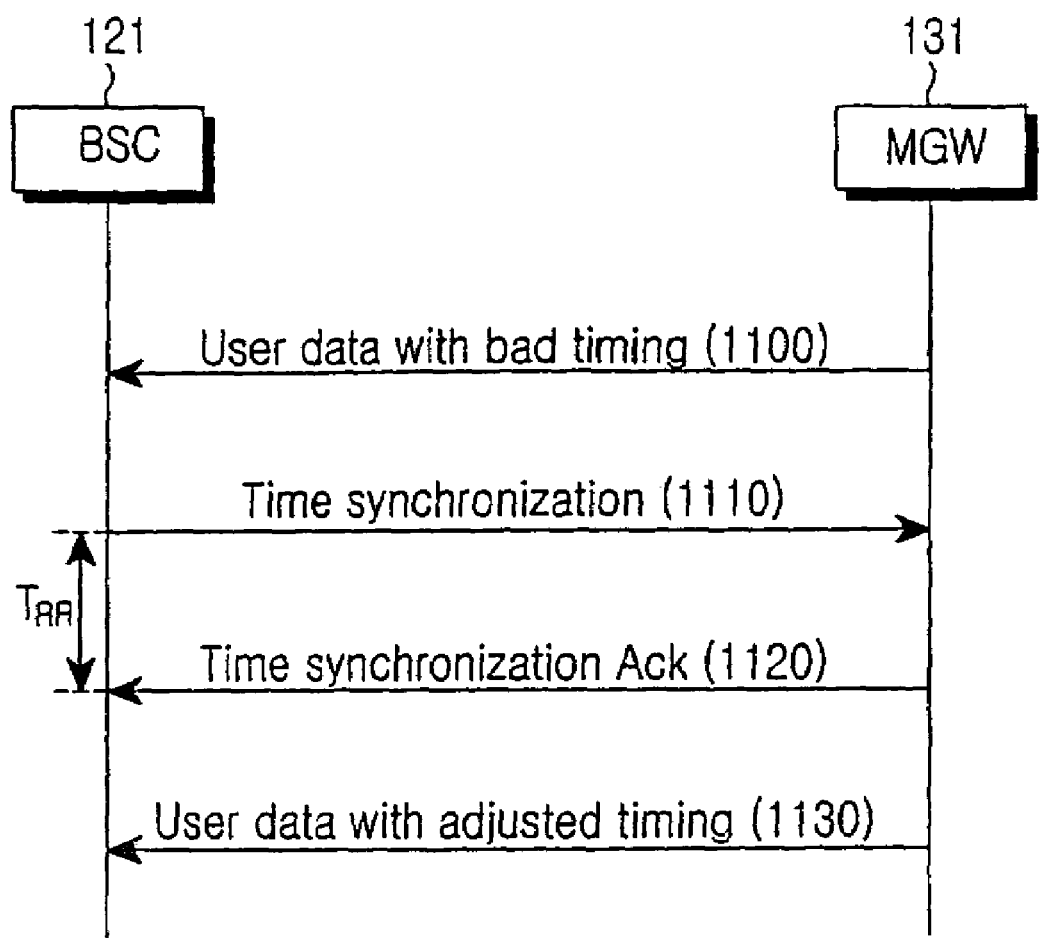
FIG. 11 is a flowchart illustrating operations in a case in which a call procedure for time synchronization is successfully performed according to an embodiment of the present invention.

FIG. 11 is a flowchart illustrating operations in a case in which a call procedure for time synchronization is successfully performed according to an embodiment of the present invention.

A base station controller 121 and a media gateway 131, each of which receives a frame, notifies each other of the amount of delay or the number of basic unit time (e.g., 500 μs or 0.125 ms), that is required in forward/reverse links, through forward/reverse frame messages, respectively.

Referring to FIG. 11, in step 1100, the base station controller 121 receives forward frames, which includes information on the number of basic time units or the length of delay due to discordance in timing from the media gateway 131.

In step 1110, the base station controller 121 checks during reception of user data (e.g., a voice data frame) either whether or not an existing frame number is changed or whether or not the actual arrival time of a forward-transmitted frame is largely different from an expected arrival time thereof. As a result, either when the existing frame number is changed or when the actual arrival time is largely different from the expected arrival time, the base station controller 121 appoints a synchronization request in an A2p reverse frame message and/or an Amp time synchronization request message, and transmits the A2p reverse frame message and/or the Amp time synchronization request message to the media gateway 131. At this time, the base station controller 121 starts to drive a timer ($T_{TSA}$), inserts an action time into the A2p reverse frame message or the Amp time synchronization request message, and transmits the A2p reverse frame message and/or the Amp time synchronization request message to the media gateway 131. Therefore, the media gateway 131 receives a control frame for matching synchronization, that is, a reverse frame including information of the time synchronization request, and adjusts transmission timing according to a required time interval. Information of the A2p reverse frame message or the Amp time synchronization request message, in which the time synchronization request is appointed, is the same as those shown in FIGS. 4A and 7.

In step 1120, the base, station controller 121 receives information elements, which control information of the received forward frame is correctly formatted and is processed by the frame protocol, from the media gateway 131 through an A2p forward frame message or an Amp time synchronization acknowledgment message. When the base station controller 121 receives the A2p forward frame message or the Amp time synchronization acknowledgment message, the base station controller 121 stops the operation of the timer. That is, an action time of the timer ($T_{TSA}$) starts after a time synchronization request frame is transmitted and ends when a time synchronization acknowledgment message is received. Information of the A2p forward frame message or the Amp time synchronization acknowledgment message, in which the time synchronization acknowledgment is appointed, is the same as those shown in FIGS. 5A and 8.

In step 1130, the base station controller 121 receives user data according to an adjusted timing from the media gateway 131.

In contrast, when the time synchronization control frame (i.e., the reverse frame including control information) received in the media gateway 131 is not normally processed, the media gateway 131 transmits "NACK", which includes information of a relevant cause, to the base station controller 121 through an A2p forward frame message or an Amp time synchronization response message.

In this case, when the base station controller 121 receives "NACK" including a cause of "Time Alignment not supported", the base station controller 121 does not transmit an additional time synchronization control frame. In contrast, when the base station controller 121 receives "NACK" including a cause of "Requested Time Synchronization not possible", the base station controller 121 again transmits a new time synchronization control frame to the media gateway 131.

As described above, a call procedure for time synchronization fails when a real-time synchronization control frame either is not correctly analyzed or is not received, or when "NACK" is received, or when the timer ($T_{TSA}$) ends. The time synchronization procedure is then re-initiated. In addition, also in a case in which time synchronization is still necessary even after a failure, the call processing procedure is again attempted.

As can be seen from the foregoing, according to the system and method of the present invention provides, a base station controller and a media gateway can be synchronized, so that transmission/reception data can be efficiently transmitted without delay.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A method for synchronizing transmission/reception time by a base station controller for delay in transmission/reception of a data frame of a digital voice signal in a mobile communication system which includes a media gateway and the base station controller, the media gateway including a trans-coder for converting an analog voice signal and a coded digital voice signal into each other, the base station controller transmitting/receiving the digital voice signal to/from the media gateway, the method comprising:
    checking whether or not forward data frames of the digital voice signal received from the media gateway are synchronized;
    appointing information of a forward delay when the forward data frames are not synchronized, and notifying the media gateway of the appointed forward delay information and a reverse data frame of the voice signal received from a mobile station;
    requesting time synchronization to the media gateway when synchronization is not established for the forward data frames received in sequence;
    receiving information of transmission timing adjusted by the media gateway according to the requested time synchronization; and
    synchronizing the forward data frames using the transmission timing information and transmitting the forward data frames to the mobile station.

2. The method as claimed in claim 1, wherein, the information of the forward delay is set as a difference value which is calculated using an expected arrival time and an actual arrival time of the forward data frames of the digital voice signal received from the media gateway.

3. The method as claimed in claim 1, wherein, in the step of requesting time synchronization to the media gateway, the base station controller appoints information of requesting synchronization of the reverse data frames during a predetermined period of time in a reverse frame message, and transmits the reverse frame message together with a transmission frame of a predetermined frame protocol.

4. The method as claimed in claim 3, wherein, the reverse frame message is transmitted through an interface through which the data frames of the digital voice signal are transmitted, and includes reverse layer-3 data information including information elements of time synchronization and a time delay.

5. The method as claimed in claim 1, wherein, in the step of requesting time synchronization to the media gateway, the base station controller appoints information of requesting synchronization of the reverse data frames during a predetermined period of time in a reverse frame message, and transmits the reverse frame message separately from a transmission frame of a predetermined frame protocol.

6. The method as claimed in claim 5, wherein, the reverse frame message is transmitted through a second interface established separately from a first interface, through which the data frames of the digital voice signal are transmitted, and includes time synchronization information and information a mobile station identification number.

7. A method for synchronizing transmission/reception time by a media gateway for delay in transmission/reception of a data frame of a digital voice signal in a mobile communication system which includes the media gateway and a base station controller, the media gateway including a trans-coder for converting an analog voice signal and a coded digital voice signal into each other, the base station controller transmitting/receiving the digital voice signal to/from the media gateway, the method comprising:
    checking whether or not reverse data frames of the digital voice signal received from the base station controller are synchronized;
    appointing information of a reverse delay when the reverse data frames are not synchronized, and notifying the base station controller of the appointed reverse delay information and a forward data frame of the digital voice signal;
    receiving a synchronization request from the base station controller when synchronization is not established for the reverse data frames received in sequence;
    adjusting transmission timing of the reverse data frame according to the synchronization request, and transmitting the adjusted information to the base station controller; and
    receiving the reverse data frame synchronized according to the adjusted transmission timing information from the base station controller.

8. The method as claimed in claim 7, wherein, the information of the reverse delay is set as a difference value which is calculated using an expected arrival time and an actual arrival time of the reverse data frames of the digital voice signal received from the base station controller.

9. The method as claimed in claim 7, wherein, in the step of receiving a synchronization request from the base station controller, the media gateway receives a reverse frame message together with a transmission frame of a predetermined frame protocol from the base station controller, in which information of requesting synchronization of the reverse data frames during a predetermined period of time has been appointed in the reverse frame message by the base station controller.

10. The method as claimed in claim 9, wherein, the reverse frame message is transmitted through an interface through which the data frames of the digital voice signal are transmitted, and includes reverse layer-3 data information including information elements of time synchronization and a time delay.

11. The method as claimed in claim 7, wherein, in the step of receiving a synchronization request from the base station controller, the media gateway receives a reverse frame message separately from a transmission frame of a predetermined frame protocol, in which information of requesting synchronization of the reverse data frames during a predetermined period of time has been appointed in the reverse frame message by the base station controller.

12. The method as claimed in claim 11, wherein, the reverse frame message is transmitted through a second interface established separately from a first interface, through which the data frame of the digital voice signal are transmitted, and includes time synchronization information and information of a mobile station identification number.

13. A system for synchronizing transmission/reception time for delay in transmission/reception of a data frame of a digital voice signal in a mobile communication system which includes a media gateway and a base station controller, the media gateway including a trans-coder for converting an analog voice signal and a coded digital voice signal into each other, the base station controller transmitting/receiving the digital voice signal to/from the media gateway, the system comprising:

the base station controller for transmitting information of a forward delay and reverse data frames of the digital voice signal, which is received from a mobile station, to the media gateway, receiving the information of the forward delay and the reverse delay, and performing a control for the synchronization; and the media gateway for transmitting information of a reverse delay to the base station controller when the media gateway receives forward data frames of voice signals from a called party, receiving the information of the forward delay and the reverse delay, and performing a control for the synchronization, wherein the base station controller checks whether or not forward data frames of the digital voice signal received from the media gateway are synchronized, requests time synchronization to the media gateway when synchronization is not established for the forward data frames received in sequence, receives information of transmission timing adjusted by the media gateway according to the time synchronization request, synchronizes the forward data frames, and transmits the forward data frames to the mobile station.

14. The system as claimed in claim 13, wherein, the information of the forward delay is set as a difference value which is calculated using an expected arrival time and an actual arrival time of the forward data frames of the digital voice signal received from the media gateway.

15. The system as claimed in claim 13, wherein, the information of the reverse delay is set as a difference value which is calculated using an expected arrival time and an actual arrival time of the reverse data frames of the digital voice signal received from the base station controller.

16. The system as claimed in claim 13, wherein, when the base station controller requests time synchronization to the media gateway, the base station controller appoints information of requesting synchronization of the reverse data frames during a predetermined period of time in a reverse frame message, and transmits the reverse frame message together with a transmission frame of a predetermined frame protocol.

17. The system as claimed in claim 16, wherein, the reverse frame message is transmitted through an interface through which the data frames of the digital voice signal are transmitted, and includes reverse layer-3 data information including information elements of time synchronization and a time delay.

18. The system as claimed in claim 13, wherein, when the base station controller requests time synchronization to the media gateway, the base station controller appoints information of requesting synchronization of the reverse data frames during a predetermined period of time in a reverse frame message, and transmits the reverse frame message separately from a transmission frame of a predetermined frame protocol.

19. The system as claimed in claim 18, wherein, the reverse frame message is transmitted through a second interface established separately from a first interface, through which the data frames of the digital voice signal are transmitted, and includes time synchronization information and information a mobile station identification number.

20. The system as claimed in claim 13, wherein, the media gateway checks whether or not reverse data frames of the digital voice signal received from the base station controller are synchronized, receives a synchronization request from the base station controller when synchronization is not established for the reverse data frames received in sequence, adjusts transmission timing of the reverse data frame according to the synchronization request, transmits the adjusted information to the base station controller, and receives the reverse data frames synchronized according to the adjusted transmission timing information from the base station controller.

21. The system as claimed in claim 20, when the media gateway receives a synchronization request from the base station controller, the media gateway receives a reverse frame message together with a transmission frame of a predetermined frame protocol from the base station controller, in which information of requesting synchronization of the reverse data frames during a predetermined period of time has been appointed in the reverse frame message by the base station controller.

22. The system as claimed in claim 21, wherein, the reverse frame message is transmitted through an interface through which the data frames of the digital voice signal are transmitted, and includes reverse layer-3 data information including information elements of time synchronization and a time delay.

23. The system as claimed in claim 20, wherein, when the media gateway receives a synchronization request from the base station controller, the media gateway receives a reverse frame message separately from a transmission frame of a predetermined frame protocol, in which information of requesting synchronization of the reverse data frames during a predetermined period of time has been appointed in the reverse frame message by the base station controller.

24. The system as claimed in claim 23, wherein, the reverse frame message is transmitted through a second interface established separately from a first interface, through which the data frame of the digital voice signal are transmitted, and includes time synchronization information and information of a mobile station identification number.

* * * * *